United States Patent
Beisswenger et al.

(10) Patent No.: US 7,056,369 B2
(45) Date of Patent: Jun. 6, 2006

(54) MEMBRANE MODULE FOR HYDROGEN SEPARATION

(75) Inventors: Thomas Beisswenger, Stuttgart (DE); Gerhard Berger, Ebersbach (DE); Thomas Poschmann, Ulm (DE); Karsten Reiners, Ulm (DE); Wolfgang Weger, Hochburg (DE); Norbert Wiesheu, Guenzburg (DE)

(73) Assignee: DaimlerChrysler AG, Stuttgart (DE)

( * ) Notice: Subject to any disclaimer, the term of this patent is extended or adjusted under 35 U.S.C. 154(b) by 126 days.

(21) Appl. No.: 10/613,557

(22) Filed: Jul. 3, 2003

(65) Prior Publication Data

US 2004/0003720 A1 Jan. 8, 2004

(30) Foreign Application Priority Data

Jul. 5, 2002 (DE) ................................. 102 30 342

(51) Int. Cl.
*B01D 53/22* (2006.01)
*B01D 71/02* (2006.01)
(52) U.S. Cl. ...................... 96/7; 95/56; 96/9; 96/11
(58) Field of Classification Search ............ 95/55, 95/56; 96/4, 7, 9, 11
See application file for complete search history.

(56) References Cited

U.S. PATENT DOCUMENTS

| | | | | |
|---|---|---|---|---|
| 2,444,222 A | * | 6/1948 | Craig | 95/56 |
| 2,618,357 A | * | 11/1952 | Harlow | 95/56 |
| 3,336,730 A | * | 8/1967 | McBride et al. | 95/56 |
| 3,486,301 A | * | 12/1969 | Bonnet | 96/7 |
| 4,874,405 A | * | 10/1989 | Minhas | 96/9 |
| 5,225,080 A | | 7/1993 | Karbachsch et al. | 210/321.75 |
| 5,298,341 A | * | 3/1994 | Khandkar et al. | 429/32 |
| 5,498,278 A | | 3/1996 | Edlund | 96/11 |
| 5,545,320 A | * | 8/1996 | Heine et al. | 210/321.6 |
| 5,645,626 A | | 7/1997 | Edlund et al. | 95/56 |
| 5,891,222 A | * | 4/1999 | Hilgendorff et al. | 96/7 |
| 6,419,726 B1 | * | 7/2002 | Frost et al. | 95/56 |
| 6,602,325 B1 | * | 8/2003 | Frost et al. | 95/56 |
| 6,764,787 B1 | * | 7/2004 | Grasso et al. | 429/38 |

FOREIGN PATENT DOCUMENTS

DE 195 27 012 2/1996
WO WO01/70376 9/2001

* cited by examiner

*Primary Examiner*—Robert H. Spitzer
(74) *Attorney, Agent, or Firm*—Davidson, Davidson & Kappel, LLC

(57) ABSTRACT

A membrane module for hydrogen separation includes a stack of flat membrane packs disposed adjacent one another so as not to exert a force on one another and a rotationally symmetrical pressure shell enclosing the stack of flat membrane packs. A feed space for a reformate gas is disposed between every two membrane packs in the stack. Each membrane pack has a pair of membrane assemblies and a support structure disposed therebetween and each membrane assembly includes a hydrogen-selective flat membrane supported by at least one membrane frame.

18 Claims, 6 Drawing Sheets

MEMBRANE MODULE FOR HYDROGEN SEPARATION

Priority is claimed to German patent application 102 30 342.8, filed on Jul. 5, 2002, the subject matter of which is hereby incorporated by reference herein.

BACKGROUND

The present invention relates to a membrane module for hydrogen separation.

Fuel cell systems, in particular those for mobile applications, may be supplied with hydrogen by reforming methanol or hydrocarbons, such as gasoline, or diesel, for example. The product gas, obtained in a reforming process, contains not only hydrogen, but also carbon monoxide, carbon dioxide, and water vapor. For the application in the fuel cell, the carbon monoxide in particular must be removed since this gas acts as a catalyst poison and results in efficiency loss of the fuel cell.

Membranes, which may be made of different materials such as ceramic, glass, polymer, or metal, for example, have been in use for a long time for hydrogen separation. Metal membranes stand out because of their high hydrogen selectivity and high temperature stability; they have, however, comparatively low permeation rates.

In order to achieve a desired permeation rate, a plurality of membrane cells is used, each having a hydrogen-selective membrane; a hydrogen-containing reformate gas flow strikes them either successively (serially) or in parallel. The membrane cells are stacked on top of one another in order to form a compact membrane module.

Membrane modules having a serial flow are described in U.S. Pat. No. 5,498,278 and in U.S. Pat. No. 5,645,626, for example, the subject matter of both patents being incorporated by reference herein.

A membrane module having a parallel flow, is known from international patent publication WO 01/70376 and contains a plurality of flat membrane packs. Each membrane pack contains two membrane assemblies, each being formed of one or two membrane frames acting as a carrier for a hydrogen-selective flat membrane, as well as a support structure between the two membrane assemblies. A plurality of these membrane packs are stacked on top of one another forming a compact stack having flat lateral surfaces, feed spaces for reformate gas being kept open between the individual membrane packs using sandwiched feed frames. At the top and bottom, this stack is held together and locked via flat end plates.

The end plates must absorb the internal gas pressure of the membrane module against the ambient pressure without bending. The end plates must be very solid since the hydrogen-containing reformate gas, obtained in an upstream reforming process from, for example, methanol, gasoline, or diesel and fed to the membrane module, is under a significantly higher pressure than the atmospheric pressure. Like many other components of the membrane module, the end plates are frequently made of metal and are therefore heavy. Their heat capacity is correspondingly high, so that heating up the membrane module to operating temperature requires considerable time and energy. In addition, complete and pressure-resistant welding of all membrane packs among one another is necessary from the design standpoint in order to achieve the required gas tightness. In the case of damage, the membrane module is irreparable since it is impossible to open the weld seam in order to replace a defective membrane.

SUMMARY OF THE INVENTION

An object of the present invention is to create a membrane module having less weight and a lower heat capacity. The present invention provides a membrane module for hydrogen separation having a plurality of flat membrane packs, each comprising two membrane assemblies which are each composed of one or two membrane frames used as carriers for a hydrogen-selective flat membrane, and a support structure which is situated between the membrane assemblies. The membrane packs form a stack in which a feed space for reformate gas is situated between every two membrane packs, wherein the membrane packs (12) are situated on top of one another essentially free of force and are enclosed by a rotationally symmetrical pressure shell (20). The pressure shell should be able to withstand the gas pressure of the reformate gas with respect to the atmospheric pressure; however, it may be designed much lighter than any flat end plates due to its rotational symmetry. In addition, the reformate gas may be supplied in a particularly simple manner from an upstream reforming process, since it may be fed into the pressure shell at any suitable point from which it may directly reach the feed spaces between the membrane packs.

A membrane module having a rotationally symmetric shell is known per se from U.S. Pat. No. 5,645,626. In this membrane module, the shell not only absorbs the gas pressure, but also a force with which the circular and serially joined membrane packs are pressed on one another. Therefore, the membrane module is to be designed to be much more solid than is the case in the present invention.

Moreover, enclosing pipe-shaped membranes essentially free of force in a rotationally symmetric pressure shell, as is described in the above-mentioned U.S. Pat. No. 5,498,278, for example, is known. So far, flat membranes have not been enclosed in this way; only appropriately solid flat end plates have been provided.

In a preferred embodiment, the membrane packs have at least one straight edge via which they are attached to a membrane pack holder which has openings for the discharge of permeate gas, i.e., hydrogen, diffused through the membranes. Since the membrane packs are held essentially free of force, no great demands have to be made on the parts for mounting the membrane packs on the membrane pack holder.

Outside the pressure shell, the openings in the membrane pack holder may be connected to a common discharge pipe. For example, a collector, e.g., a flanged, pot-shaped shell in which the permeate gas from all membrane packs is collected and discharged via a pipeline, may be situated on the side of the membrane pack holder facing away from the pressure shell. Since the permeate gas pressure is only slightly higher than the atmospheric pressure, the shell of the collector must withstand a substantially lower pressure than the pressure shell on the reformate side which is subject to a pressure of 10 to 125 atmospheres.

The membrane pack holder preferably forms a base of the rotationally symmetric pressure shell, and in the ideal case, the membrane pack holder has a circular shape and the rotationally symmetric pressure shell has a cylindrical shape.

The raffinate gas, i.e., the hydrogen-depleted reformate gas, may be collected in an annular line surrounding the stack of membrane packs, and may be discharged either at a suitable point through the pressure shell, or via one or several additional openings in the membrane pack holder.

Wire netting or other porous materials are used as gas permeable support structures for supporting the membranes against the trans-membrane pressure difference and for discharging the reformate gas from the space between the two membranes of a membrane pack, according to the related art. Materials of different porosities have been stacked on top of one another to create flat supporting surfaces for the membranes and to minimize the flow resistance of the support structure, as is described in the above-mentioned international patent publication WO 01/70376, for example.

A substantially lower flow resistance is achieved if, instead of more or less irregular or winding support structures such as wire netting and the like, perforated support foils are used which support the membranes against the trans-membrane pressure difference, and if a support plate is placed between the support foils of the two membranes of each membrane assembly, the support plate having a plurality of straight channels which run parallel to one another and to the membranes and which advantageously end in the openings in the membrane pack holder.

In this way, the gas flow away from the membrane and the subsequent gas flow parallel to the membrane are separated from one another, and the respective flow paths may be hydraulically optimized, namely as straight channels and not as winding and irregular passages as is the case with wire netting and other porous structures.

By suitably placing the holes, the flow resistance of the support foils may be optimized; the support plates may simply be manufactured using sheet metal which is provided with webs, or is bent multiple times to form the channels.

Rectangular membranes in membrane frames which are rectangular both outside and inside are used for maximum material utilization of the expensive membrane material. If the membranes are welded along their edges on or between membrane frames, the load on the corners is heavier than on the edges during operation. Such corner stresses are prevented in an embodiment of the present invention in which the inner edge of each membrane frame has the shape of a rectangle having rounded corners.

In order to form a membrane assembly, it is currently preferred to place each membrane between two membrane frames. Alternatively, there is the possibility of welding each membrane onto only one membrane frame, thus saving the other membrane frame.

The above-described support structure may be made more rigid than conventional support structures based on more or less irregularly shaped materials; however, each efficiently manufacturable support structure yields a little when the membranes are subjected to pressure. This creates a notch strain on the membrane material on the internal membrane-side edges of the reformate-side membrane frames. In order to reduce this notch strain, these edges are rounded in an embodiment of the present invention.

During manufacture of the membrane assemblies, the membranes are normally welded onto or between the membrane frames at room temperature. However, the membrane material has a substantially lower coefficient of heat expansion than stainless steel, of which the membrane frames are usually manufactured. Since the membrane module is operated at approximately 400° C., the membrane material is under tensile stress during operation.

This is avoided in an embodiment of the present invention by using an expansion reserve which is established by providing the flat surface of one of the two membrane frames of a membrane assembly with a channel which extends around the inner edge of the membrane frame and which is accessible for a hold-down with which the membrane is pressed into the channel during welding.

The membrane frames may alternatively be manufactured of rust- and acid-resistant steel, having approximately a coefficient of heat expansion that is equal to or less than that of the membrane material.

In membrane packs having a parallel flow, as described herein, it is important that the reformate gas flow strikes all membrane packs as evenly as possible to achieve good efficiency. In order for the flow to the outside membranes to be the same as to the inside membranes, feed spaces of the same size are provided on the uppermost and lowermost membrane packs of the stack of membrane packs as between two adjacent membrane packs, the uppermost and lowermost feed spaces being delimited by gastight plates which terminate the stack of membrane packs to the top and to the bottom.

A negative hydrogen concentration gradient perpendicular to the membrane surface appears in the feed spaces during continuous diffusion of hydrogen through the membranes, which reduces the efficiency theoretically expected. This effect is countered in an embodiment of the present invention by devices for making the gas turbulent, which are preferably plate-shaped components made of porous material which essentially completely fill the respective feed spaces. These components are made porous to the extent that the gain in efficiency due to hydrogen turbulence transversely to the foil is greater than the loss due to the greater flow resistance.

A high temperature catalyst stage, frequently positioned upstream from membrane modules, generates additional hydrogen and carbon dioxide from carbon monoxide and water. According to the present invention, this high temperature catalyst stage may advantageously be accommodated within the pressure shell.

The spaces between the stack of membrane packs and the rotationally symmetric pressure shell may be filled with insulating material as heat insulation to the outside.

BRIEF DESCRIPTION OF THE DRAWINGS

Further features and advantages of the present invention arise from the following description of exemplary embodiments based upon the drawings, in which:

FIGS. 7 (a), (b), and (c) show different possibilities for positioning the holes in the support foil;

FIG. 8 (a) shows a top view of a support plate between two membrane assemblies;

FIGS. 8 (b) and (c) show schematic sectional views of support plates having different shapes;

FIGS. 9 (a) and (b) show sketches for visualizing a detail of the membrane pack holders;

DETAILED DESCRIPTION

Figure 1:
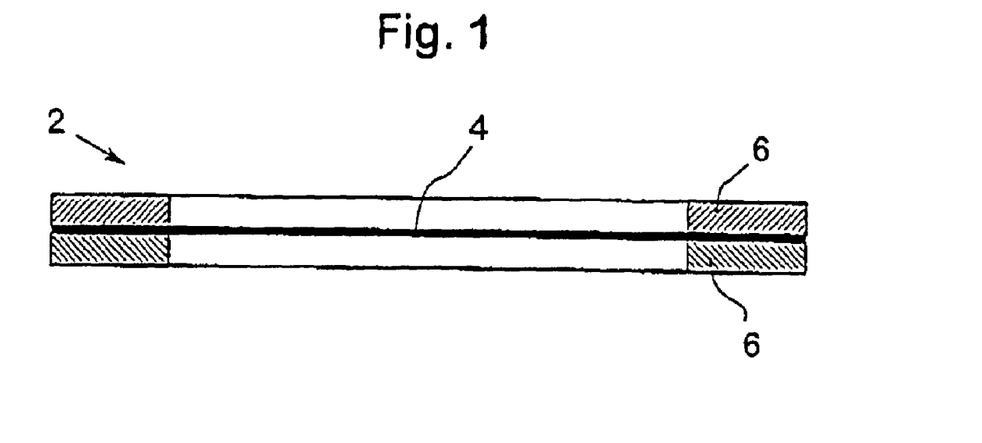
FIG. 1 shows a schematic sectional view of a membrane assembly.

As shown in FIG. 1, membrane assembly 2 is composed of a rectangular thin membrane 4 which is welded gastight between two rectangular membrane frames 6 made of metal (normally stainless steel), their external dimensions being a little larger and their internal dimensions being a little smaller than those of membrane 4.

Membrane 4 is preferably a metal foil made of palladium, palladium alloys, or refractive metals such as vanadium, niobium, and tantalum and their alloys. This membrane ensures an almost infinite hydrogen selectivity and thus an adequate purity of the permeate gas for supplying fuel cells.

Figure 2:
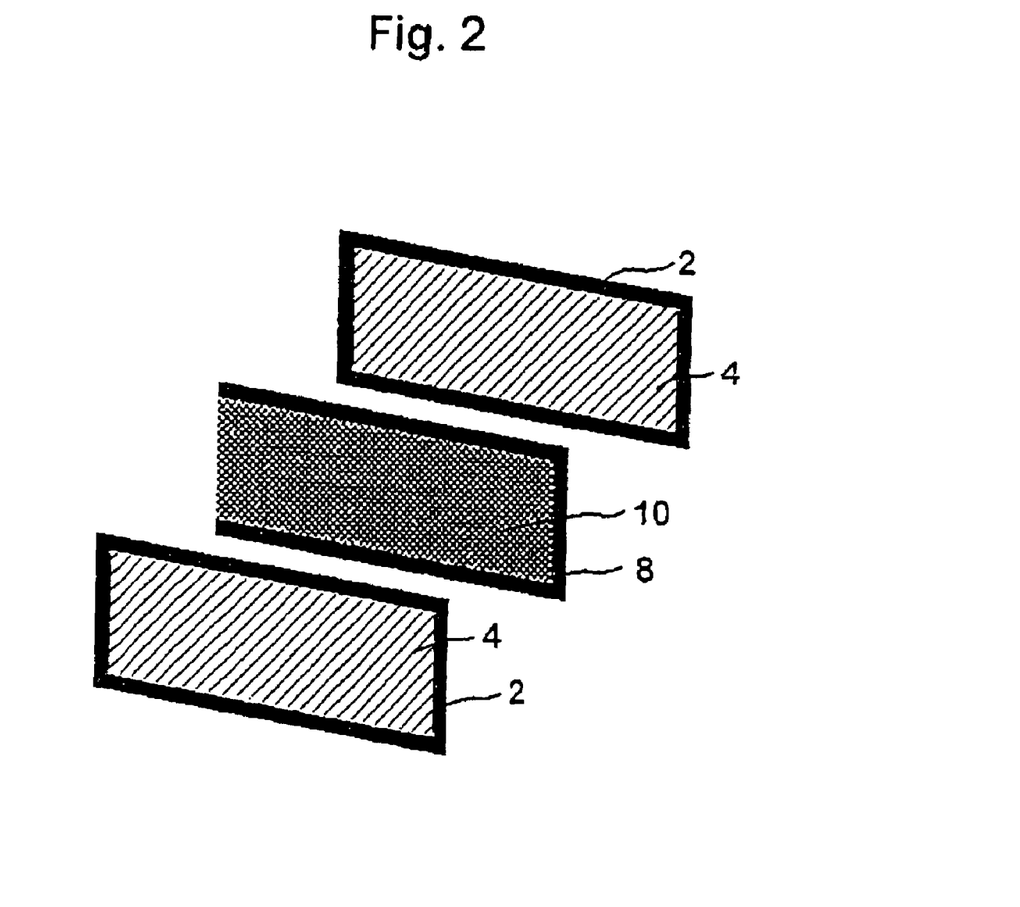
FIG. 2 shows a perspective exploded view of a membrane pack.
Figure 3:
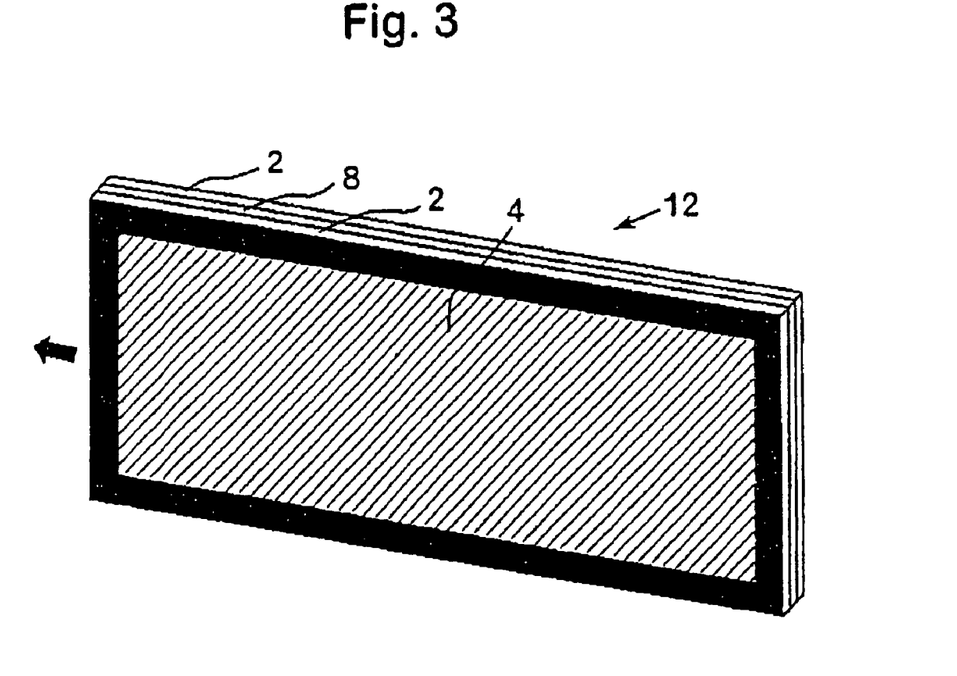
FIG. 3 shows a schematic perspective view of a membrane pack.

As shown in FIGS. 2 and 3, two membrane assemblies are arranged flush on top of one another with a support structure 8 between them, support structure 8 being composed of a U-shaped steel frame, a gas permeable support structure 10 extending between its legs. Both membrane assemblies 2 and support structure 8 are welded together under stress on all three sides which correspond to the sides of the U-shaped steel frame of support structure 8.

This creates a layer structure which is shown in FIG. 3 and which is referred to in the following as membrane pack 12. As indicated with an arrow in FIG. 3, hydrogen, diffused through membranes 4, may escape on the open side of the U-shaped steel frame of support structure 8. This welded layer structure of membrane pack 12 ensures mechanical stability and gastightness without having to provide any seals and without having to subject the membrane pack to pre-stress in order to press the seals.

Figure 4:
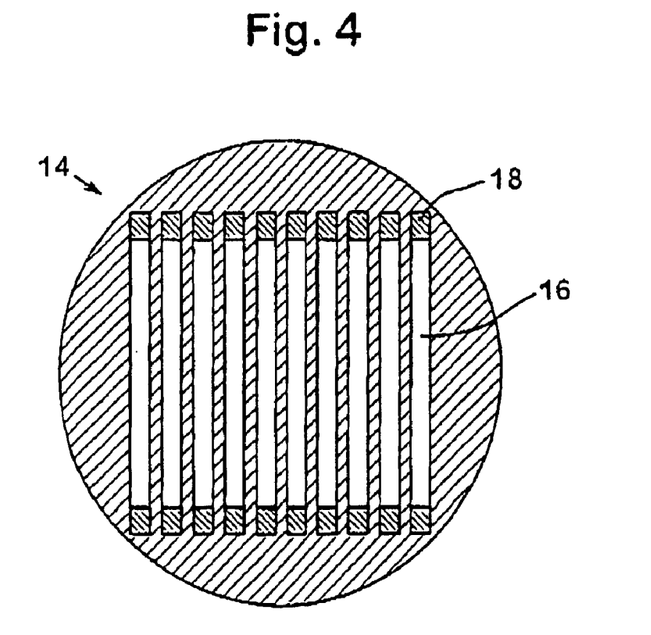
FIG. 4 shows a top view of a membrane pack holder.

A plurality of these membrane packs 12 is inserted into a membrane pack holder 14 which is shown in FIG. 4. Membrane pack holder 14 is a round steel plate containing a plurality of parallel rectangular slots 16, whose width corresponds to the thickness of membrane packs 12 and whose length corresponds to the length of the shorter side of membrane packs 12. Each membrane pack 12 is inserted into a slot 16 in membrane pack holder 14 with the side on which the U-shaped steel frame of support structure 8 is open, shoulders 18 on the bottom of slots 16 forming stops which prevent membrane packs 12 from sliding through.

Slots 16 are regularly spaced so that a rectangular feed space via which hydrogen-containing reformate gas may reach membranes 4 is kept clear between every two membrane packs 12. If membrane packs 12 are attached to membrane pack holder 14 completely freestanding and are adequately rigid, each feed space may have three open sides, in principle.

On the other hand, membrane packs 12 are constructed to save material, since the gas pressure differences acting on them are balanced and membrane packs 12 do not have to be supported against any gas pressures. In the present exemplary embodiment, such relatively thin membrane packs 12 are held also on their longitudinal sides by suitable holding devices which additionally seal the feed spaces laterally, or membrane packs 12 are connected on their longitudinal sides to form a self-supporting block. The reformate gas flows lengthwise through the feed spaces in the direction of membrane pack holder 14, if it flows in from the remaining open side.

The holding devices or lateral connections of membrane packs 12 have only to absorb minor forces; this type of attachment of membrane packs 12 is therefore referred to as essentially free of force.

Figure 5:
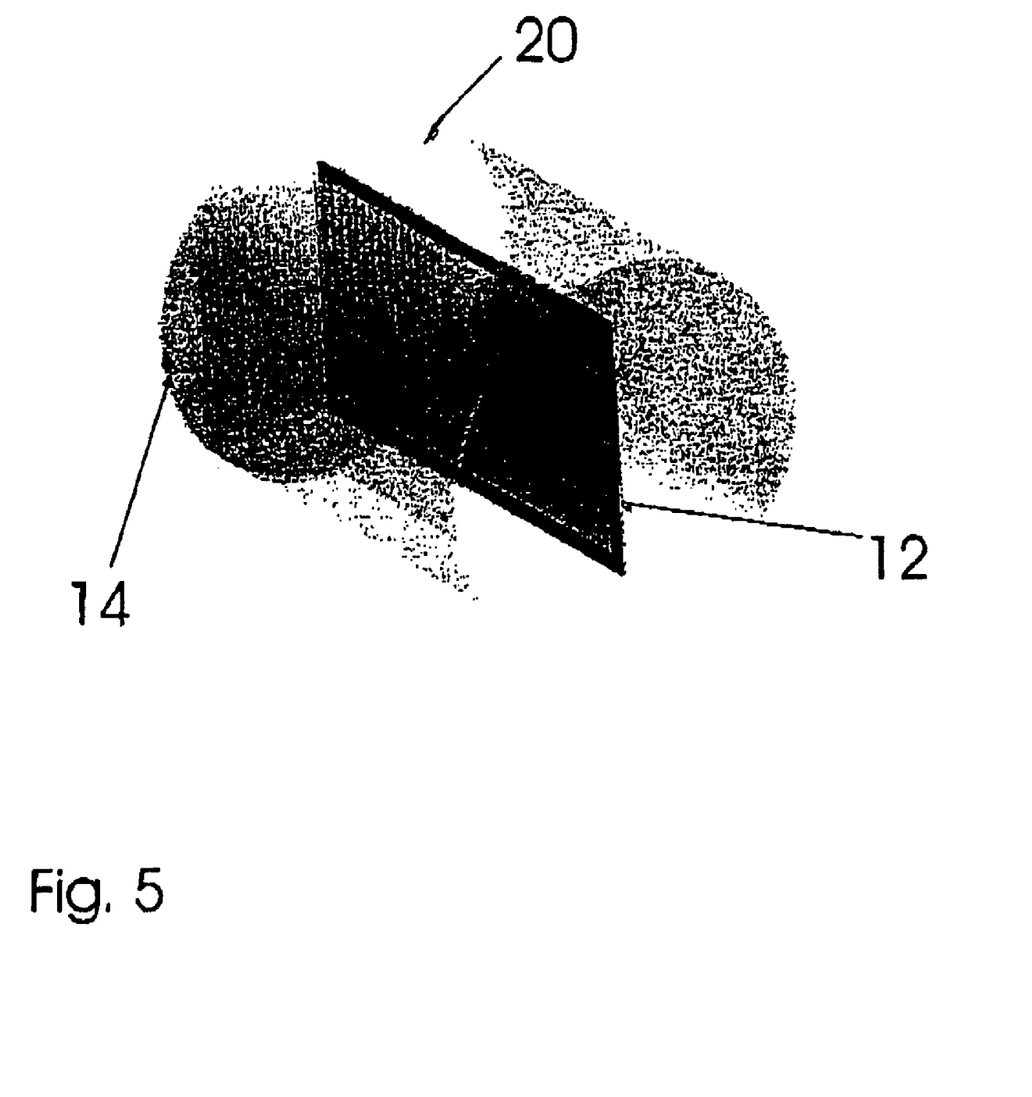
FIG. 5 shows a schematic perspective view of a membrane pack which is installed in a cylindrical pressure shell.

As shown in FIG. 5, membrane pack holder 14, including inserted membrane packs 12, of which only one is shown in FIG. 5, is enclosed by a hollow cylinder made of metal which has the same diameter as membrane pack holder 14 and whose other end is closed. The gastight connection of membrane pack holder 14 with the rim of the hollow cylinder creates a gastight pressure shell 20 around membrane packs 12.

If membrane pack holder 14 is connected to the hollow cylinder not by welding but by seals, then, in the case of defects, the membrane module may be easily disassembled and repaired. Alternatively, the hollow cylinder is designed such that, at its end opposite membrane pack holder 14, it is closed by a detachable lid having seals. The most frequent type of defect is the leakage of a single membrane 4 which results in a gas leak to the permeate side. After opening the membrane module, the gas inlet surfaces situated in front of defective membrane 4 may be welded gastight and, after re-assembly, the membrane module may be used again without great performance loss. Under certain conditions, the respective raffinate outlet slot 16 outside on membrane pack holder 14 may be welded shut without opening pressure shell 20 of the membrane module.

During operation, hydrogen-containing reformate gas, which is obtained from alcohol and hydrocarbons in an upstream reforming process, is conducted into pressure shell 20 via a welded-on pipe or any other gastight lead-through in the hollow cylinder with a pressure of 12 bar, for example, and a temperature of 400° C., for example. The reformate gas enters between membrane packs 12 where it acts upon membranes 4.

Hydrogen, diffused through membranes 4, passes gas permeable support structure 8 in membrane packs 12 in the direction of slots 16 in membrane pack holder 14 and is collected and discharged on the other side of membrane pack holder 14, e.g., into a collector which is a pot-shaped shell flanged to membrane pack holder 14; all slots 16 in membrane pack holder 14 open into the pot-shaped shell which is connected to a pipeline for forwarding all the permeate gas obtained.

While the reformate gas passes membranes 4, its hydrogen content is reduced and it is again conducted to the outside as hydrogen-depleted raffinate gas. Openings on the longitudinal sides of the feed spaces in the proximity of membrane pack holder 14 are provided for this purpose, the openings being connected with one another via a circular channel surrounding the stack of membrane packs, for example. The annular channel or the like is connected to a pipeline which runs through pressure shell 20 or membrane pack holder 14 to the outside of the membrane module.

Figure 6:
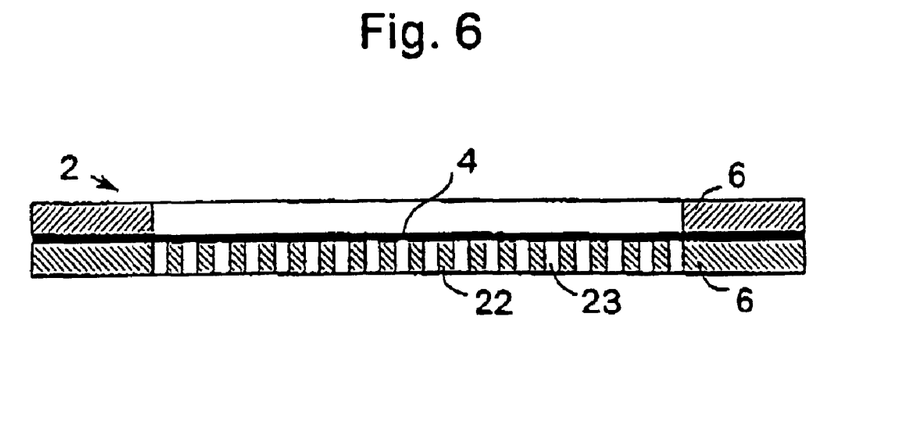
FIG. 6 shows a schematic sectional view of a membrane assembly and an associated support foil.
Figure 7:
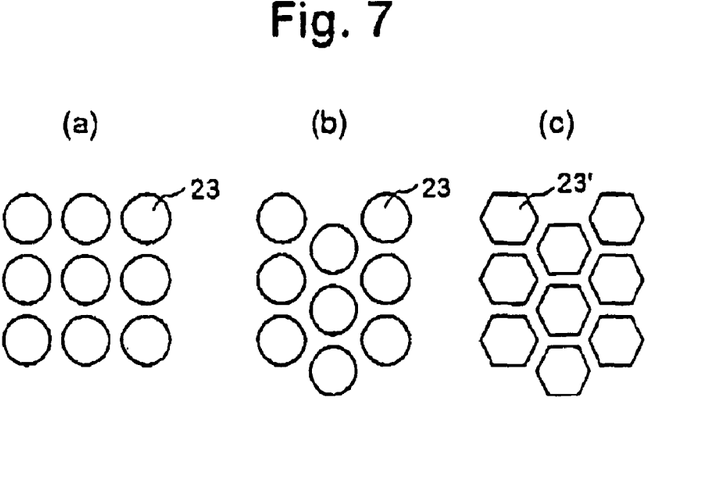
Figure 8:
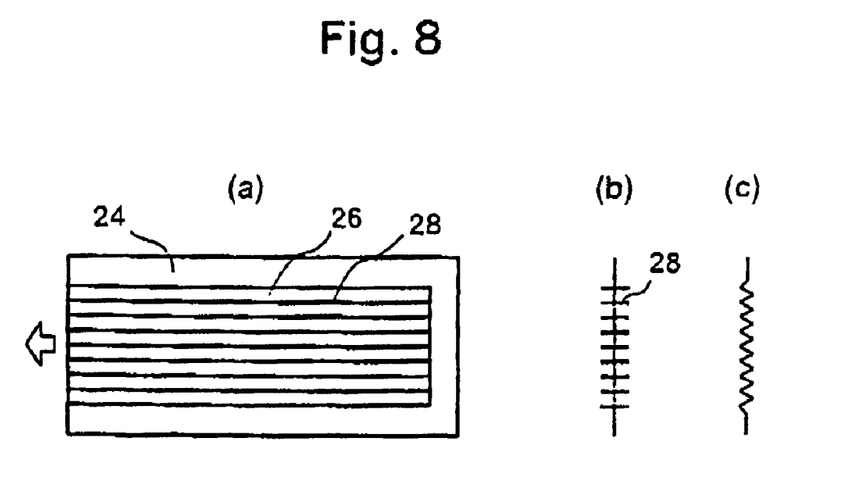

Support structure 8 between every two membrane assemblies 2 is described in greater detail based upon FIGS. 6, 7, and 8. Other gas permeable structures stacked on top of one another, different from this exemplary embodiment, may also be used or combined as support structures, e.g., wire netting, fabric, non-wovens, or foam (e.g., metal foam or porous ceramic), between two perforated foils on which the membranes of one membrane assembly rest, the intermediate layer supporting the perforated foils and facilitating the gas discharge from the membrane assembly, or, as described later, an intermediate layer having the channel structure, formed by webs, and double-sided layers made of fabric, non-wovens, or foam or the like on which the membranes rest, or any other suitable combinations of such gas permeable materials.

As shown in FIG. 6, membrane 4 of each membrane assembly 2 rests on a support foil 22 on the reformate side, the support foil having a plurality of tiny holes 23 which may be distributed over support foil 22 in various ways. FIGS. 7 (a) and (b) show a parallel or a staggered arrangement of round holes 23, and FIG. 7 (c) shows a honeycomb pattern having hexagonal holes 23', their webs causing the least covering of the membrane surface, so that the diffusion efficiency is affected as little as possible. In FIG. 7 (c), membrane 4 is not supported by circular structures which provide the most favorable tension distribution; however, the membranes are supported at least approximately along circles, which also favors the tension distribution.

Compared to wire netting or an unstructured porous support layer, perforated support foil 22 has the advantage that the membrane is largely supported on flat surfaces and that the gas flows in a straight line and on a cross section as large as possible, i.e., with minimal pressure loss.

Due to the direct contact between membrane 4 and support foil 22, intermetallic diffusion may occur, causing the formation of intermetallic phases in membrane 4 which may affect the diffusion performance of membrane 4. In the above-described hole arrangements, this takes place, in any event, so close to the edges of holes 23 that an additional non-reactive separation layer between membrane 4 and support foil 22, which otherwise must be used, may be dispensed with.

In order to save material and for a minimum flow resistance, support foil 22 has a relatively thin design. Hence, it must also be supported, and in addition, the permeate gas must be discharged parallel to support foil 22. These two functions are met by a support plate 24 between support foils 22 of two membranes 4 of a membrane assembly 2 which is described in the following.

Support plate 24, shown in FIG. (8a) in top view, contains a plurality of straight channels 26 which run parallel to one another and to membranes 4. When the membrane module is assembled, channels 26 open into the respective slot 16 in membrane pack holder 14 at one end of support plate 24. For example, support plate 24 may be made of sheet metal which is provided with webs 28 (as in the sectional view of FIG. 8 (b)), or it is bent multiple times (as in the sectional view of FIG. 8 (c)), thereby forming channels 26.

Webs 28 may be made very thin or pointed, so that holes 23 in support foil 22 are covered as little as possible. As indicated with an arrow in FIG. 4, the permeate gas having flowed through holes 23 flows through straight channels 26 to the permeate gas outlet with minimal pressure loss.

Membranes 4 are cut out of strip stock and welded gastight onto a membrane frame 6, or are welded between two membrane frames 6, depending on whether one or two membrane frames 6 are used per membrane assembly. A preferred welding method is resistance roller seam welding in which the metal parts to be welded together are passed between two rollers which are pressed against each other with an electric current flowing between them. Alternative welding methods are electron beam welding, laser beam welding, or ultrasound welding, or membranes 4 may be soldered on.

Figure 9:
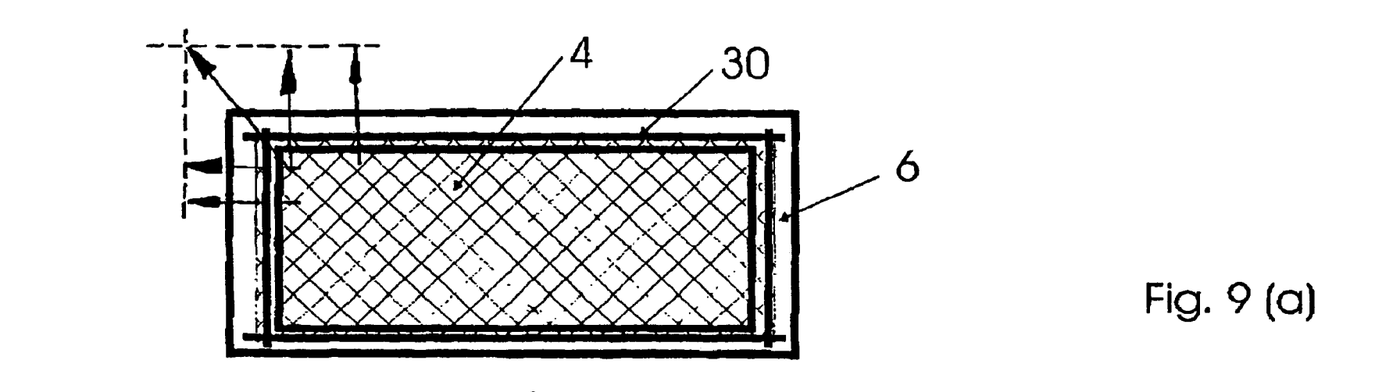

When membranes 4, along weld seams 30, are welded together with outside and inside rectangular membrane frames 6, as shown in FIG. 9 (a), and are loaded during operation by pressurized reformate gas, the above-described support structure 8 also yields a little, causing membrane 4, through superposition of tensions, to be subjected to a higher stress in the corner areas than on the sides, as illustrated in FIGS. 9 (a) and 9 (b) by force vectors. In order to reduce these corner stresses, membrane frames 6 or at least all membrane frames 6 on the reformate side are provided with rounded corners 31 on the inside, as shown in FIG. 9 (b).

Figure 10:
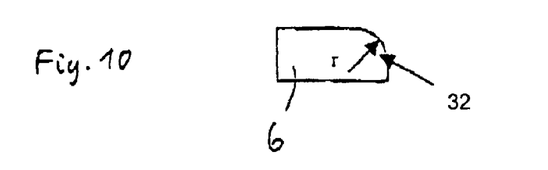
FIG. 10 shows a sketch for visualizing an additional detail of the membrane pack holders.

Due to yielding support structure 8, during operation membranes 4 are additionally pressed on and behind the membrane-side edges of the inner rims of reformate-side membrane frames 6, thus creating a notch strain. To avoid this, these edges are rounded, as shown in FIG. 10 which is a partial cross section through a membrane frame 6. Roundings 32 may be produced by grinding and/or buffing and/or by electrical erosion methods.

During manufacture of the membrane assemblies, the membrane is normally welded at room temperature. However, the membrane material has a considerably lower coefficient of heat expansion than stainless steel, of which the membrane frames are normally made. Since the membrane module is operated at approximately 400° C., the membrane material is tensile stressed during operation.

Figure 11:
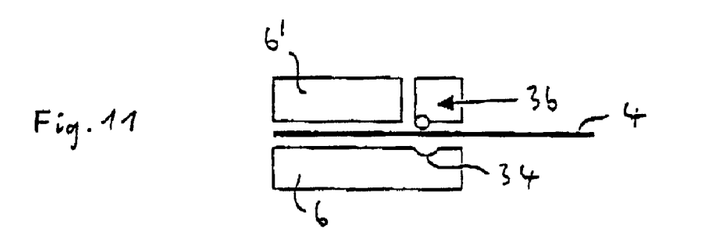
FIG. 11 shows a sketch for visualizing yet another detail of the membrane pack holders.

This is avoided, according to the exemplary embodiment in FIG. 11, in that the membrane is provided with an expansion reserve when welding. This is established in that the membrane-side surface of each raffinate-side membrane frame 6 is provided with a channel 34 which extends around the inner edge of this membrane frame 6, and that permeate-side membrane frame 6' is made a little larger inside than raffinate-side membrane frame 6, as shown in FIG. 11 which is a partial cross section through the two membrane frames 6, 6' and membrane 4 in between. Since permeate-side membrane frame 6' is larger, channel 34 is accessible for a hold-down 36 with which membrane 4 is pressed into channel 34 during welding.

Membrane frames 6 may alternatively be manufactured of rust- and acid-resistant steel, having approximately a coefficient of heat expansion that is equal to or greater than that of the membrane material.

If the membrane material and membrane frames 6 have different coefficients of heat expansion, it has to be assumed that displacements between membrane 4 and support structure 8 occur at the start-up of the membrane module. It is therefore suggested that for start-up the membrane module is heated up to the operating temperature without differential pressure, so that membrane 4 is able to shift on support structure 8. Since the desired hydrogen separating capability of membranes 4 is only reached in this temperature range, heating up should take place as quickly as possible.

As described in FIG. 5, this is supported by the round design of pressure shell 20 whereby, compared to flat end plates, approximately 50% of weight may be saved. In addition, the above-described design of the membrane module results in particularly quick heating of membranes 4 during the heating-up phase during which they are acted upon by hot reformate gas, since membrane pack holder 14 including slots 16 is situated downstream, forming the mechanical holder of membrane packs 12 and thus a heat bridge.

Pieces of insulating material having a crescent cross section may be placed in the spaces between the cuboid-shaped stack of membrane packs 12 and round pressure shell 20, essentially filling the spaces and being used as outward heat insulation. For example, pressed pieces of a light microporous insulating material or molded pieces of insulating matting are suitable as pieces of insulating material.

Figure 12:
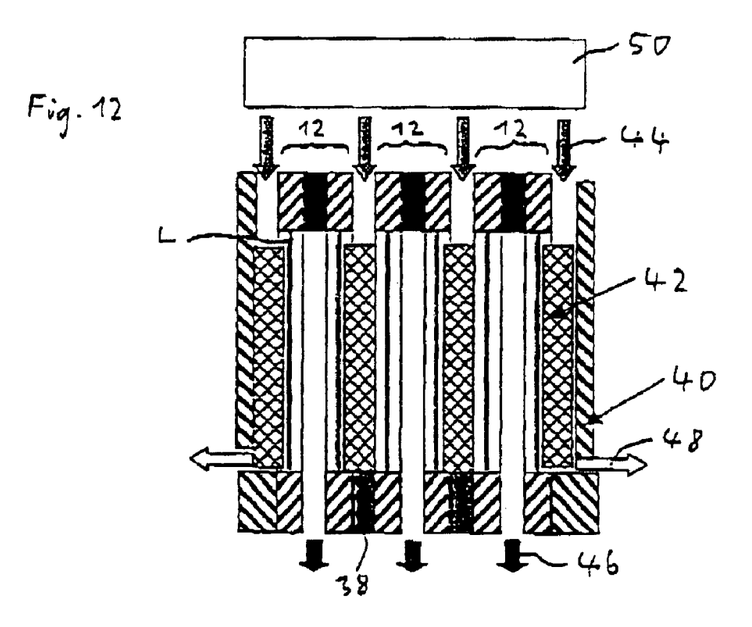
FIG. 12 shows a schematic sectional view through a membrane module without the pressure shell and the membrane pack holder.

FIG. 12 is a sectional view through a stack of membrane packs 12, membrane pack holder 14 and pressure shell 20 being omitted here. Only three membrane packs 12 having one membrane 4 each are shown in this schematic view; in practice, a membrane module contains many membrane packs 12. In order to delimit the feed spaces for the reformate gas, membrane packs 12 are kept at a distance to one another by slots 16 in membrane pack holder 14, which are spaced from one another, or by additional sheets 38. Sheets 38 may also extend along the longitudinal sides of membrane packs 12, or they are welded together on their longitudinal sides to keep the reformate gas flow between membrane packs 12.

To ensure that the gas flow strikes the outermost membranes 4 and the inner membranes 4, according to FIG. 12, in the same manner, a gastight plate 40 is situated to the left and right of the two outermost membrane packs 12, at the same distance as the distances between adjacent membrane packs 12, which define the thickness of the feed spaces. Plates 40 provide for identical geometries in the feed of reformate gas, since they do not have to absorb significant forces due to the enclosing pressure shell 20.

However, it is difficult to achieve a really uniform distribution of all partial flows to individual membranes 4 when the feed spaces between membrane packs 12 and the feed spaces between the outermost membrane packs 12 and the gastight plates 40 are empty. This is due to the fact that the pressure differentials occurring here are small, so that even minor measurement and position inaccuracies of the components have an effect on the flow distribution.

To even out the partial flows, the feed spaces may be filled with plate-shaped components 42 made of porous material, as is shown FIG. 12. The plate-shaped porous components 42 not only provide for exactly defined flow resistances in the individual partial flows, but also cause gas turbulence while gas is flowing through them. The advantage of this gas turbulence is explained in the following.

Hydrogen depletion, i.e., hydrogen partial pressure reduction, takes place due to the permeation (diffusion) occurring at membrane 4, which creates two negative concentration gradients: one parallel to membrane 4 in the flow direction and one perpendicular on membrane 4. These concentration gradients reduce the theoretically possible permeation performance.

The concentration gradient parallel to membrane 4 may be reduced by suitably directing the flow. In the present exemplary embodiment, the concentration gradient perpendicular to membrane 4 is reduced due to the fact that the gas is automatically stirred also transversely to membranes 4 while it flows through the plate-shaped porous components 42, so that local concentration gradients are avoided.

Knit wire fabrics or foams of metal or ceramic may be suitable materials for the plate-shaped porous components 42.

In FIG. 12, reformate gas partial flows into the individual feed spaces are indicated by arrows 44, and permeate gas partial flows from the spaces in which support structures 8 (not shown here) are situated are indicated by arrows 46. Permeate gas partial flows 46 move outward through slots 16 in membrane pack holder 14.

Raffinate gas partial flows discharge at the end of the membrane module opposite the reformate gas inlet, as is schematically indicated with arrows 48 for the outermost feed spaces. Specifically, the raffinate gas discharge may take place via an annular line, for example, which, close to membrane pack holder 14 or integrated therein, extends around the stack of membrane packs 12, connecting the feed spaces with one another and with a pipeline which runs through pressure shell 20 or membrane pack holder 14 to the outside of the membrane module.

A high temperature catalyst stage which generates additional hydrogen and carbon dioxide from carbon monoxide and water is frequently positioned upstream from membrane modules. Such a high temperature catalyst stage 50, schematically indicated in FIG. 12, may be accommodated in the same pressure shell 20 as is the membrane module so that a separate pressure shell for high temperature catalyst stage 50 is saved.

Round pressure shell 20 offers the option of providing high temperature catalyst stage 50 with either a rectangular or a round design. A suitable design of high temperature catalyst stage 50, having an outlet, for example, which extends evenly transversely to the entire width of the stack of membrane packs 12, may additionally facilitate the even distribution of permeate gas partial flows 44 entering the stack of membrane packs 12.

What is claimed is:

1. A membrane module for hydrogen separation, comprising:
a stack of flat membrane packs disposed adjacent one another so as not to exert a force on one another, a feed space for a reformate gas disposed between every two membrane packs in the stack, each membrane pack having a pair of membrane assemblies and a support structure disposed between the pair of membrane assemblies, each membrane assembly including a hydrogen-selective flat membrane supported by at least one membrane frame;
a rotationally symmetrical pressure shell enclosing the stack of flat membrane packs; and
a device for creating gas turbulence disposed in at least one of the feed spaces.

2. The membrane module as recited in claim 1, further comprising a membrane pack holder having a plurality of openings for discharging a permeate gas and wherein the membrane packs have at least one straight edge attached to the membrane pack holder.

3. The membrane module as recited in claim 2, wherein the membrane pack holder forms a base that is attached to the rotationally symmetrical pressure shell.

4. The membrane module as recited in claim 3, wherein the membrane pack holder has a circular shape and the rotationally symmetrical pressure shell has a cylindrical shape.

5. The membrane module as recited in claim 2, wherein the support structure of each membrane assembly includes a pair of perforated support foils and a support plate disposed between the pair of support foils, the support structure supporting the membrane of a respective membrane assembly against a trans-membrane pressure differential, the support plate containing plurality of straight channels running parallel to one another and to the membrane.

6. The membrane module as recited in claim 5, wherein the plurality of straight channels communicates with the plurality of openings in the membrane pack holder.

7. The membrane module as recited in claim 5, wherein each support plate is made of sheet metal including multiple bends so as to form the channels.

8. The membrane module as recited in claim 5, wherein each support plate is made of sheet metal including multiple webs for forming the channels.

9. The membrane module as recited in claim 2, further comprising a gas collector extending transversely to the openings in the membrane pack holder on a side of the membrane pack holder facing away from the pressure shell.

10. The membrane module as recited in claim 1, wherein an inner edge of each membrane frame has the form of a rectangle with rounded corners.

11. The membrane as recited in claim 10, wherein each membrane is welded in a gastight manner along edges of the membrane onto the at least one membrane frame.

12. The membrane module as recited in claim 1, wherein each membrane frame facing the reformate gas includes inner rims having rounded membrane-side edges.

13. The membrane module as recited in claim 1, a flat surface of one of the at least one membrane frames of each membrane assembly includes a channel extending around an inner edge of the membrane frame, the being accessible for a hold-down for pressing the membrane into the channel during welding.

14. The membrane module as recited in claim 1, wherein each membrane frame includes steel having a coefficient of heat expansion equal to or less than a coefficient of heat expansion of the membrane.

15. The membrane module as recited in claim 1 further comprising an upper gastight plate, a lower gastight plate, an upper feed space disposed on an uppermost membrane pack of the stack and a lower feed space disposed on the lowermost membrane pack, the upper and lower feed spaces having a same size as the feed spaces disposed between every two membrane packs, the upper and lower feed spaces being delimited by the upper and lower gastight plates.

16. The membrane module as recited in claim 1, wherein the device includes a plate-shaped component made of a porous material at least partially filling the feed space.

17. The membrane module as recited in claim 1, further comprising a high temperature catalyst stage, disposed upstream from the stack of membrane packs and within the pressure shell.

18. The membrane module as recited in claim 1, further comprising an insulating material at least partially filling a space between the stack of membrane packs and the rotationally symmetrical pressure shell.

* * * * *

UNITED STATES PATENT AND TRADEMARK OFFICE
CERTIFICATE OF CORRECTION

| | | |
|---|---|---|
| PATENT NO. | : 7,056,369 B2 | Page 1 of 1 |
| APPLICATION NO. | : 10/613557 | |
| DATED | : June 6, 2006 | |
| INVENTOR(S) | : Thomas Beisswenger et al. | |

It is certified that error appears in the above-identified patent and that said Letters Patent is hereby corrected as shown below:

Column 11, line 13 should read "inner edge of the membrane frame, the channel being accessible for" instead of "inner edge of the membrane frame, the being accessible for".

Signed and Sealed this

Twenty-first Day of November, 2006

JON W. DUDAS
*Director of the United States Patent and Trademark Office*